United States Patent
Bouffard et al.

(10) Patent No.: US 9,057,432 B1
(45) Date of Patent: Jun. 16, 2015

(54) CONTINUOUSLY VARIABLE TRANSMISSION DRIVE PULLEY

(71) Applicant: BOMBARDIER RECREATIONAL PRODUCTS INC., Valcourt (CA)

(72) Inventors: Eric Bouffard, Fleurimont (CA); Sylvain Matte, Otterburn Park (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 259 days.

(21) Appl. No.: 13/852,585

(22) Filed: Mar. 28, 2013

(51) Int. Cl.
*F16H 63/00* (2006.01)
*F16H 55/56* (2006.01)

(52) U.S. Cl.
CPC .............. *F16H 55/56* (2013.01); *F16H 55/563* (2013.01)

(58) Field of Classification Search
CPC ......... F16H 55/56; F16H 55/563; F16H 9/18; F16H 9/125; F16H 61/66272
USPC ......................................................... 474/14
See application file for complete search history.

(56) References Cited

U.S. PATENT DOCUMENTS

| | | | | | |
|---|---|---|---|---|---|
| 4,036,068 | A | * | 7/1977 | Gilbert | 474/14 |
| 4,051,739 | A | * | 10/1977 | Takagi et al. | 474/14 |
| 4,102,214 | A | * | 7/1978 | Hoff | 474/13 |
| 4,575,363 | A | * | 3/1986 | Burgess et al. | 474/14 |
| 5,209,703 | A | * | 5/1993 | Mastine et al. | 474/14 |
| 5,326,330 | A | * | 7/1994 | Bostelmann | 474/13 |
| 6,346,056 | B1 | * | 2/2002 | Nouis et al. | 474/14 |
| 6,811,504 | B2 | * | 11/2004 | Korenjak et al. | 474/14 |
| 2002/0042313 | A1 | * | 4/2002 | Aitcin | 474/8 |
| 2003/0221890 | A1 | * | 12/2003 | Fecteau et al. | 180/210 |
| 2008/0296076 | A1 | * | 12/2008 | Murayama et al. | 180/219 |
| 2014/0004984 | A1 | * | 1/2014 | Aitcin | 474/14 |

* cited by examiner

*Primary Examiner* — William E Dondero
*Assistant Examiner* — Minh Truong
(74) *Attorney, Agent, or Firm* — BCF LLP

(57) ABSTRACT

A drive pulley for a continuously variable transmission has a fixed sheave, a movable sheave, and a biasing member. At least one arm is pivotally connected about a first axis to one of the movable sheave and a portion of the drive pulley axially and rotationally fixed to the fixed sheave. The arm has a ramp surface. At least one slider is pivotally connected about a second axis to the other one of the movable sheave and the portion of the drive pulley. The at least one slider has at least three slider surfaces. At least one of the at least three slider surfaces is adapted to contact the ramp surface of the at least one arm.

20 Claims, 9 Drawing Sheets

CONTINUOUSLY VARIABLE TRANSMISSION DRIVE PULLEY

TECHNICAL FIELD

The present invention relates to drive pulleys and centrifugal actuators for continuously variable transmissions.

BACKGROUND

Many vehicle drivetrains incorporate a continuously variable transmission (CVT) having a drive pulley that is operatively coupled to the engine crankshaft and a driven pulley coupled to a driven shaft. The drive pulley transfers torque to the driven pulley via a drive belt looped around both pulleys.

The drive pulley includes centrifugal actuators, similar to the centrifugal actuator 300 of FIG. 1, through which the drive ratio of the drive pulley is varied progressively as a function of the engine speed. Each centrifugal actuator 300 includes an arm 302 and a roller 304. The drive pulley also includes a movable sheave that is movable axially and a fixed sheave and a housing which are axially fixed. The movable sheave is disposed axially between the housing and the fixed sheave. The fixed sheave, the housing and the movable sheaves are rotatable together. The movable sheave is movable axially toward the fixed sheave by the action of the centrifugal actuators 300 and away from the fixed sheave by a biasing spring. An end 306 of each of the arms 302 of the centrifugal actuators is connected to the movable sheave of the drive pulley by an axle, and pivots outwards about the axle. The rollers 304 are connected to the housing in alignment with the arms 302.

When the arms 302 pivot outwards as a result of centrifugal force, their corresponding rollers 304 roll along the ramp surfaces 312 of the central portions 310 of the arms toward the ends 308 of the arms 302 and the axially movable sheave is pushed towards the fixed sheave.

Although the movable sheave is described as being rotationally fixed relative to the housing and the fixed sheave, there may be some small rotational movement of the movable sheave relative to these parts resulting from manufacturing tolerances and/or wear of the parts. This small relative rotational movement causes the roller 304 and the arm 302 of each centrifugal actuator 300 to move relative to each other in a direction generally parallel to the pivot axis of the arm 302. This relative movement between the roller 304 and the arm 302 causes wear of the outer surface 314 of the roller 304 which can lead to one or more flat spots. Once a flat spot is formed, when the flat spot comes in contact with the ramps surface 312, the roller 304 stops rolling along the ramp surface 312 and slides on this flat spot along the ramp surface 312, thus causing the flat spot to wear even more and get bigger. Thus, as soon as a flat spot appears on the roller 304, the roller 304 is considered worn and is replaced by another roller 304.

Therefore, there is a need for a drive pulley having a centrifugal actuator that does not need to have an element thereof that needs to be replaced as soon as some wear occurs.

SUMMARY

It is an object of the present to ameliorate at least some of the inconveniences present in the prior art.

In one aspect, a drive pulley for a continuously variable transmission has a fixed sheave, a movable sheave axially movable relative to the fixed sheave, the movable sheave being rotationally fixed relative to the fixed sheave, and a biasing member biasing the movable sheave axially away from the fixed sheave. At least one arm is pivotally connected about a first axis to one of the movable sheave and a portion of the drive pulley axially and rotationally fixed to the fixed sheave. The arm has a ramp surface. At least one slider is in alignment with the ramp surface of the at least one arm. The at least one slider is pivotally connected about a second axis to the other one of the movable sheave and the portion of the drive pulley. The at least one slider has at least three slider surfaces. At least one of the at least three slider surfaces is adapted to contact the ramp surface of the at least one arm. The at least one arm pivots about the first axis as a speed of rotation of the drive pulley increases. The ramp surface of the at least one arm pushes against one of the slider surfaces of the at least one slider adapted to contact the ramp surface as the at least one arm pivots about the first axis thereby moving the movable sheave axially toward the fixed sheave.

In a further aspect, the portion of the drive pulley is a housing axially and rotationally fixed to the fixed sheave.

In an additional aspect, the at least one arm is pivotally connected about the first axis to the movable sheave and the at least one slider is pivotally connected about the second axis to the housing.

In a further aspect, the at least one slider has at least five slider surfaces and at least two of the at least five slider surfaces are adapted to contact the ramp surface of the at least one arm.

In an additional aspect, the at least one slider has less than eight slider surfaces.

In a further aspect, the at least one slider has seven slider surfaces and at least three of the seven slider surfaces are adapted to contact the ramp surface of the at least one arm.

In an additional aspect, the seven slider surfaces are adapted to contact the ramp surface of the at least one arm.

In a further aspect, at least three of the at least three slider surfaces are adapted to contact the ramp surface of the at least one arm.

In an additional aspect, each of the at least three slider surfaces is adapted to contact the ramp surface of the at least one arm.

In a further aspect, the at least one slider has an odd number of slider surfaces.

In a further aspect, a cross-section of the at least one slider taken about a plane normal to the second axis is generally heptagonal in shape.

In an additional aspect, the ramp surface of the at least one arm and the at least one of the at least three slider surfaces of the at least one slider are complementary in shape.

In a further aspect, the ramp surface of the at least one arm is convex and the at least one of the at least three slider surfaces of the at least one slider is concave.

In an additional aspect, each of the at least three slider surfaces of the at least one slider is concave.

In a further aspect, a length of the at least one of the at least three slider surfaces of the at least one slider is greater than a distance from the second axis to a center of the at least one of the at least three sliders surfaces of the at least one slider.

In an additional aspect, a length of the at least one of the at least three slider surfaces of the at least one slider is less than 20 percent of a length of the ramp surface of the at least one arm.

In a further aspect, for each of the at least one slider: an axle is connected to the other one of the movable sheave and the portion of the drive pulley, a sleeve is disposed around the axle and the slider is disposed around the sleeve.

In an additional aspect, the at least one arm has a protrusion adjacent the ramp surface at an end of the at least one arm opposite an end of the at least one arm that is pivotally connected to the one of the movable sheave and the portion of the drive pulley.

In a further aspect, one of the at least three slider surfaces of the at least one slider other than the slider surface of the at least one slider in contact with the ramp surface contacts the protrusion to limit pivoting of the at least one arm about the first axis.

In an additional aspect, the at least two of the at least five slider surfaces adapted to contact the ramp surface of the at least one arm include a first slider surface adapted to contact the ramp surface and a second slider surface adapted to contact the ramp surface. The first slider surface adapted to contact the ramp surface is separated from the second slider surface adapted contact the ramp surface by at least one other of the at least five slider surfaces on each side thereof. The at least one slider can be turned while the drive pulley is not rotating to put either one of the first and second slider surfaces adapted to contact the ramp surface in contact with the ramp surface.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIGS. 9A to 9E are schematic illustrations of alternative embodiments of sliders.

DETAILED DESCRIPTION

The present drive pulley for a continuously variable transmission (CVT) will be described with respect to a drivetrain of an all-terrain vehicle (ATV). However, it is contemplated that the drive pulley could be used in a CVT for other vehicles, such as, but not limited to, a motorcycle, a scooter, a three-wheel road vehicle and a snowmobile.

Figure 1:
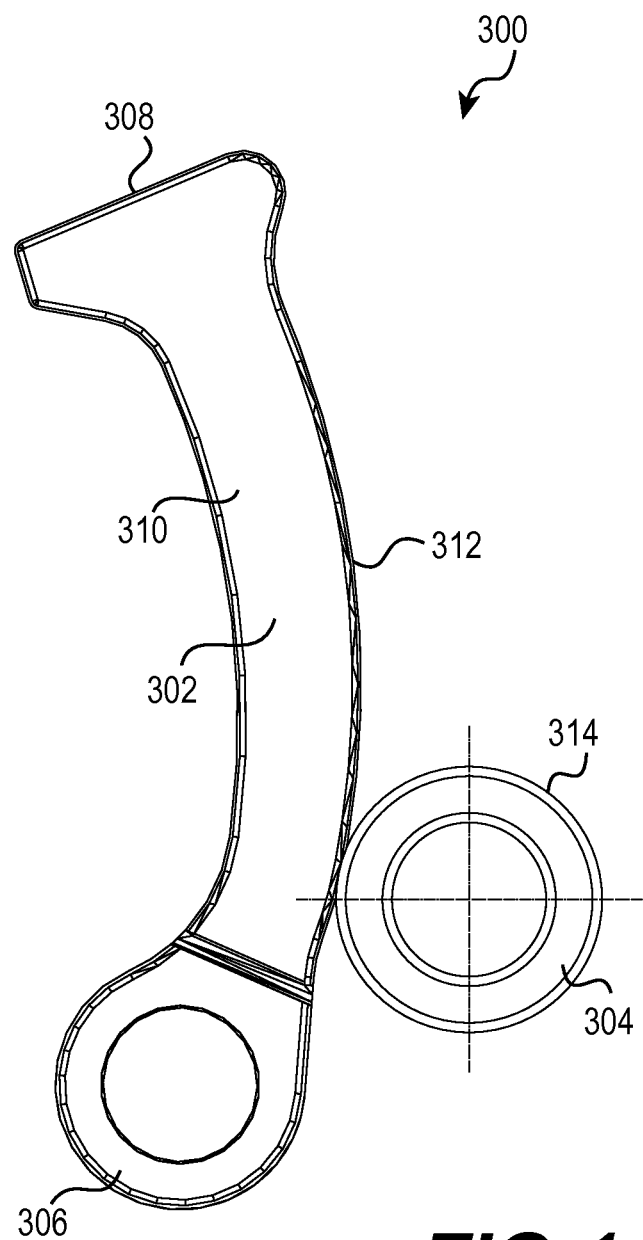
FIG. 1 is a side elevation view of an arm and roller of a prior art centrifugal actuator for a CVT drive pulley.
Figure 2:
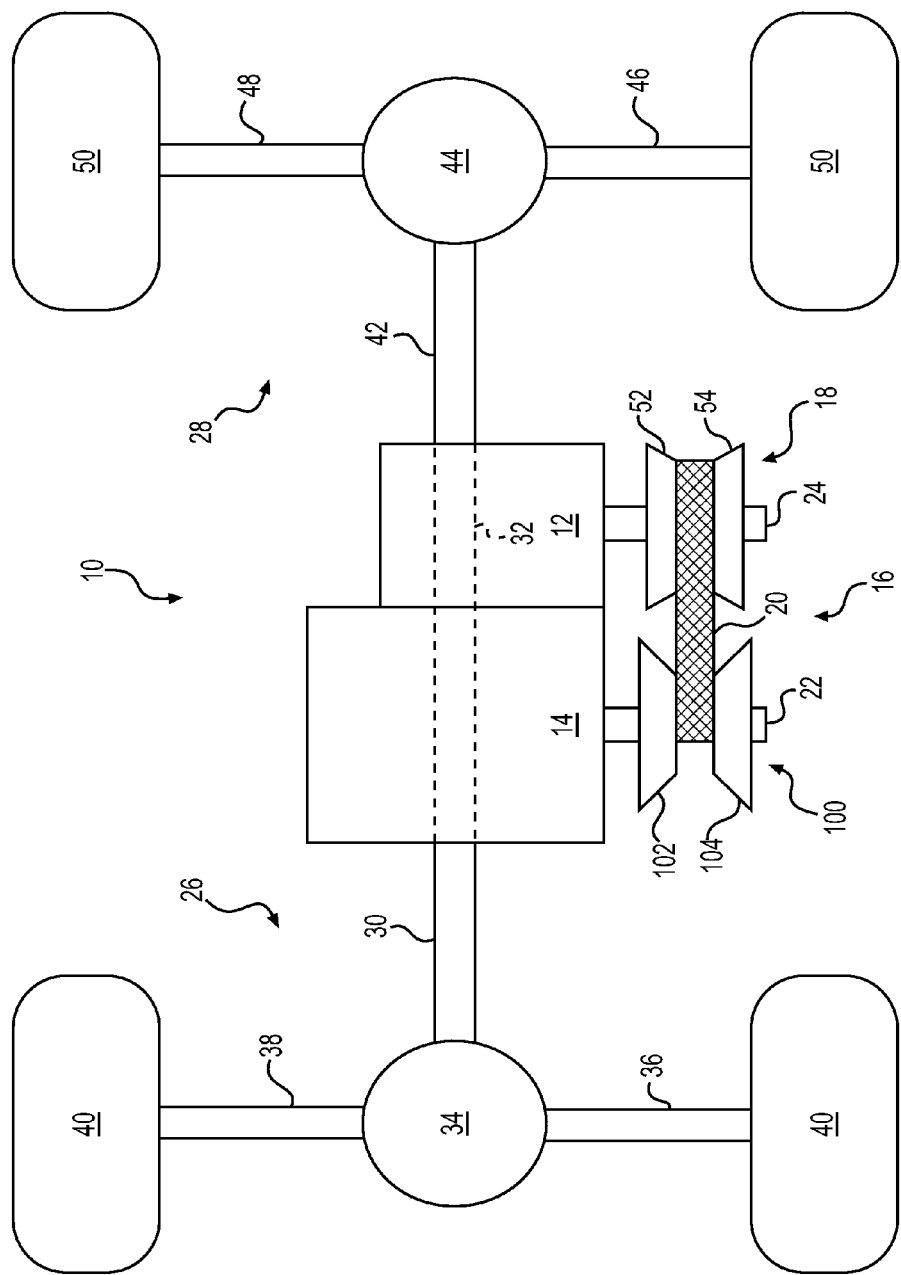
FIG. 2 is schematic representation of a drivetrain of an all-terrain vehicle.
Figure 3:
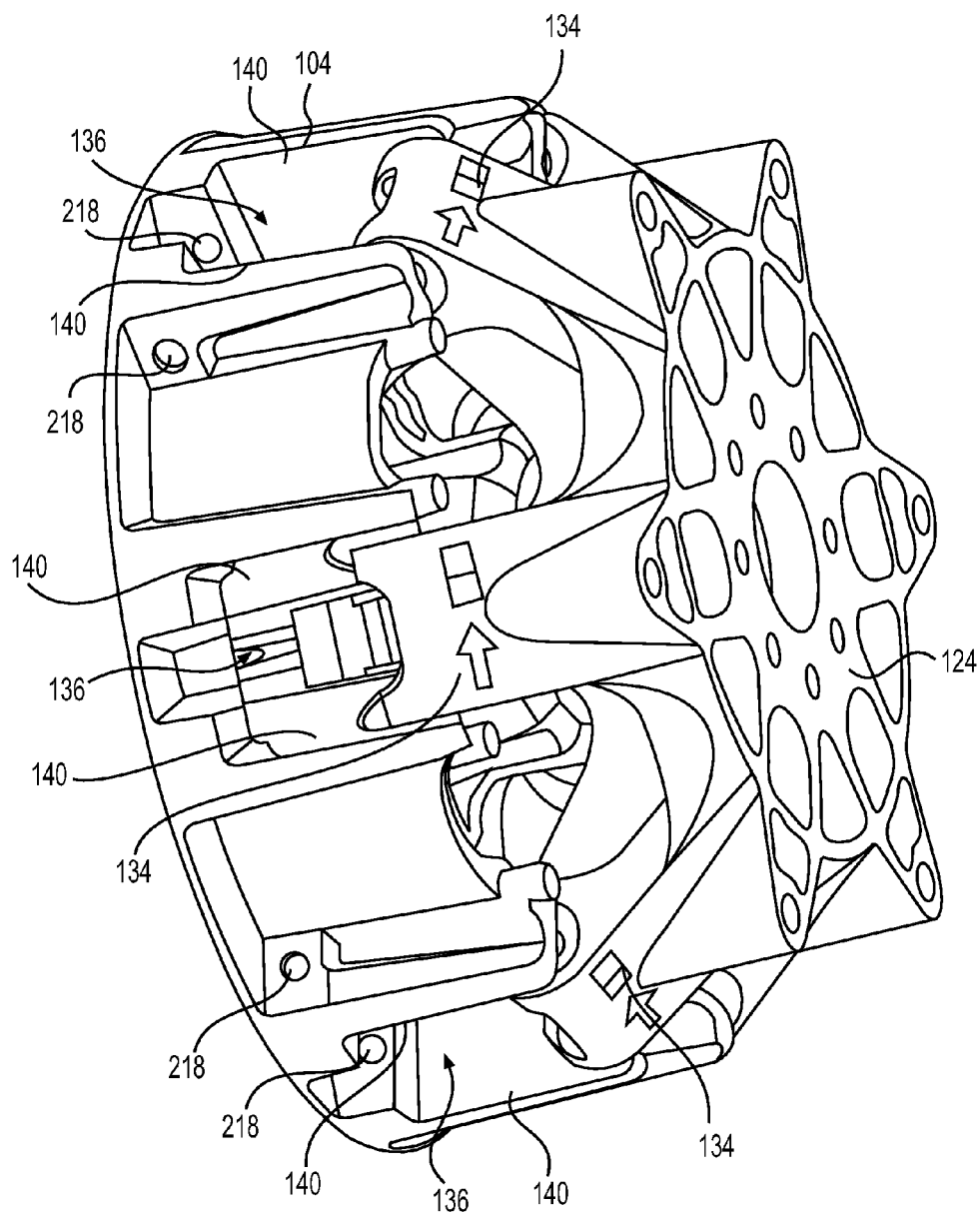
FIG. 3 is a perspective view of a housing and a movable sheave of a drive pulley of a CVT of the drivetrain of FIG. 2.
Figure 4:
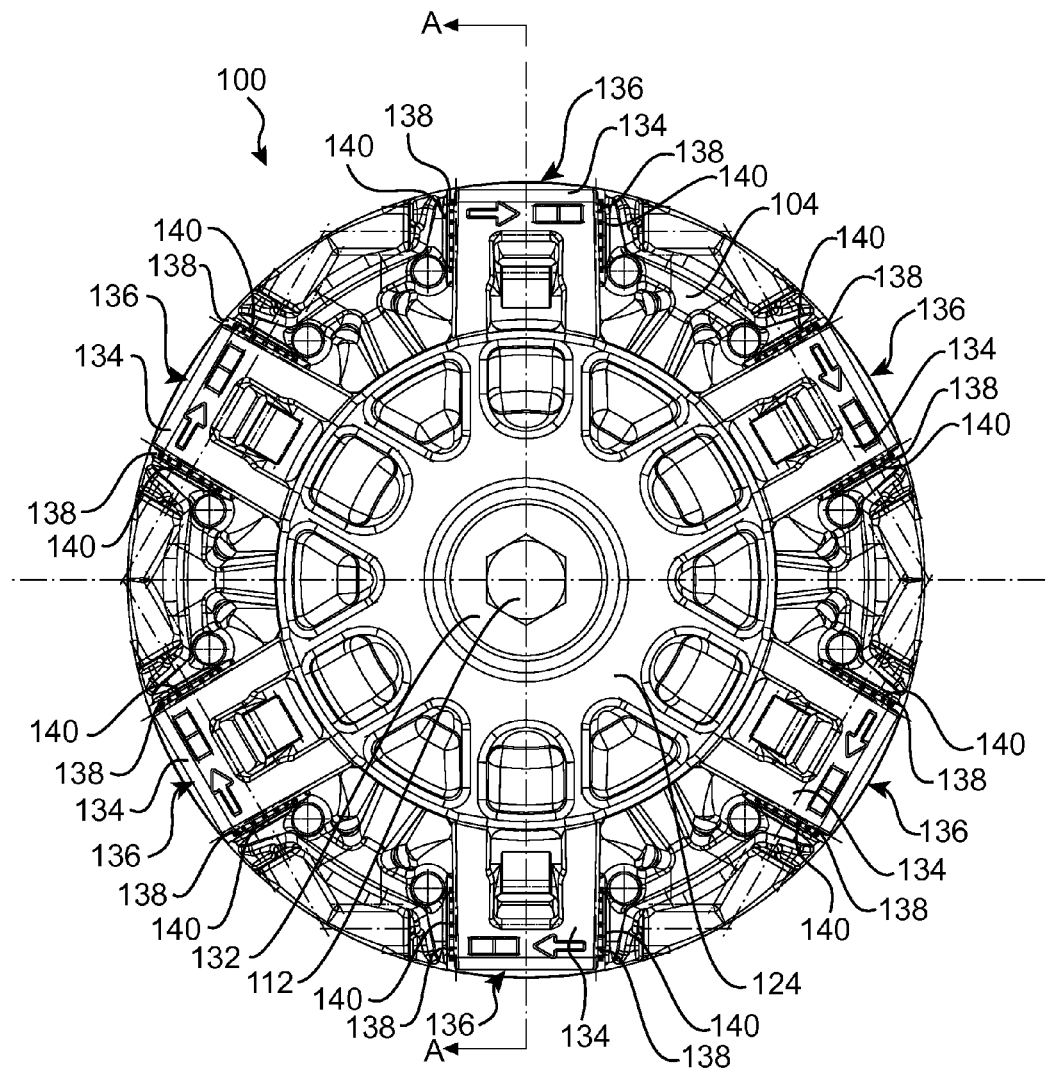
FIG. 4 is a side elevation view of the drive pulley of the CVT of the drivetrain of FIG. 2.

FIG. 2 illustrates schematically a drivetrain 10 of an ATV. United States Patent Publication No. US 2013/0041566 A1, published Feb. 14, 2013, the entirety of which is incorporated herein by reference, provides a description of an exemplary embodiment of an ATV.

The drivetrain 10 includes a transmission 12 that is detachably connected to a rear portion of an engine 14 of the ATV. The engine 14 and the transmission 12 are operatively connected by a continuously variable transmission (CVT) 16. The CVT 16 has drive pulley 100, a driven pulley 18 and a drive belt 20. The drive pulley 100 is mounted to the crankshaft 22 of the engine 14 and drives the driven pulley 18 via the drive belt 20. The driven pulley 18 is mounted to an input shaft 24 that delivers power to the transmission 12. The transmission 12 has a gearbox (not shown) to reduce the angular velocity of the input shaft 24 in favor of greater torque and to permit operation of the ATV in reverse. The CVT 16 will be described in more detail below.

The transmission 12 operatively connects to both a front drive system 26 and a rear drive system 28. The front drive system 26 includes a front drive shaft 30 selectively connected at a rearward end to the transmission 12 (i.e. to a forward end of an intermediary shaft 32 of the transmission 12) and at a forward end to a front differential 34. The front drive shaft 30 is selectively connected to the intermediary shaft 32 by a 2WD-4WD selector coupling (not shown) disconnecting or connecting the drive shaft 30 from the intermediary shaft 32 depending on whether the ATV is to be operated in a two-wheel drive (2WD) mode or a four-wheel drive (4WD) mode. The front differential 34 is connected to a left front axle 36 and a right front axle 38 that are, in turn, connected to the front wheels 40. Likewise, the rear drive system 28 includes a rear drive shaft 42 connected at a forward end to the transmission 12 (i.e. to a rearward end of the intermediary shaft 32 of the transmission 12) and at a rearward end to a rear differential 44. The rear differential 44 connects to a left rear axle 46 and a right rear axle 48 that are, in turn, connected to the rear wheels 50. The above is an exemplary embodiment of a drivetrain and other embodiments are contemplated.

The drive pulley 100 of the CVT 16 includes a pair of opposed frustoconical belt drive sheaves 102 and 104 between which the drive belt 20 is located. The drive belt 20 is made of rubber, but it is contemplated that it could be made of metal linkages or other composite materials. The drive pulley 100 will be described in greater detail below. The driven pulley 18 includes a pair of frustoconical belt drive sheaves 52 and 54 between which the drive belt 20 is located. As can be seen, the drive belt 20 is looped around both the drive pulley 100 and the driven pulley 18. The torque being transmitted to the driven pulley 18 provides the necessary clamping force on the drive belt 20 through its torque sensitive mechanical device in order to efficiently transfer torque to the further drivetrain components. The effective diameters of the drive pulley 100 and the driven pulley 18 are the result of the equilibrium of forces on the drive belt 20 from six centrifugal actuators 200 (or centrifugal adjustment systems) of the drive pulley 100 and the torque sensitive mechanism of the driven pulley 18. The centrifugal actuators 200 will be described in greater detail below.

The drive pulley 100 rotates at the same speed as the crankshaft 22 of the engine 14 whereas the speed of rotation of the input shaft 24 is determined in accordance with the instantaneous ratio of the CVT 16, and the shafts 30, 32, 42 rotate at a lower speed than the input shaft 24 because of the action of the transmission 12.

It is contemplated that the drive pulley 100 could be coupled to an engine shaft other than the crankshaft 22, such as an output shaft, a counterbalance shaft, or a power take-off shaft driven by and extending from the engine 14. The shaft driving the drive pulley 100 is therefore generally referred to as the driving shaft. Although the present embodiment is being described with the crankshaft 22 being the driving shaft, it should be understood that other shafts are contemplated. Similarly, it is contemplated that the driven pulley 18 could be coupled to a shaft other than the input shaft 24, such as directly to one or more shafts operatively connected to the propulsion element of the vehicle (i.e. the wheels 40, 50 in the case of the ATV). The shaft driven by the driven pulley 18 is therefore generally referred to as the driven shaft. Although the present embodiment is being described with the input shaft 24 being the driven shaft, it should be understood that other shafts are contemplated.

Turning now to FIGS. 3 to 6, the drive pulley 100 will be described in more detail. As discussed above, the drive pulley 100 includes a pair of opposed frustoconical belt drive sheaves 102 and 104. Both sheaves 102 and 104 rotate together with the crankshaft 22. The sheave 102 is fixed in an axial direction of the crankshaft 22, and is therefore referred to as the fixed sheave 102. The fixed sheave 102 is also rotationally fixed relative to the crankshaft 22. The sheave 104 can move toward or away from the fixed sheave 102 in the axial direction of the crankshaft 22 in order to change the drive ratio of the CVT 16, and is therefore referred to as the movable sheave 104. The movable sheave 104 is also rotationally fixed relative to the crankshaft 22 and the fixed sheave 102. As can be seen in FIG. 2, the fixed sheave 102 is disposed between the movable sheave 104 and the engine 14.

Figure 5:
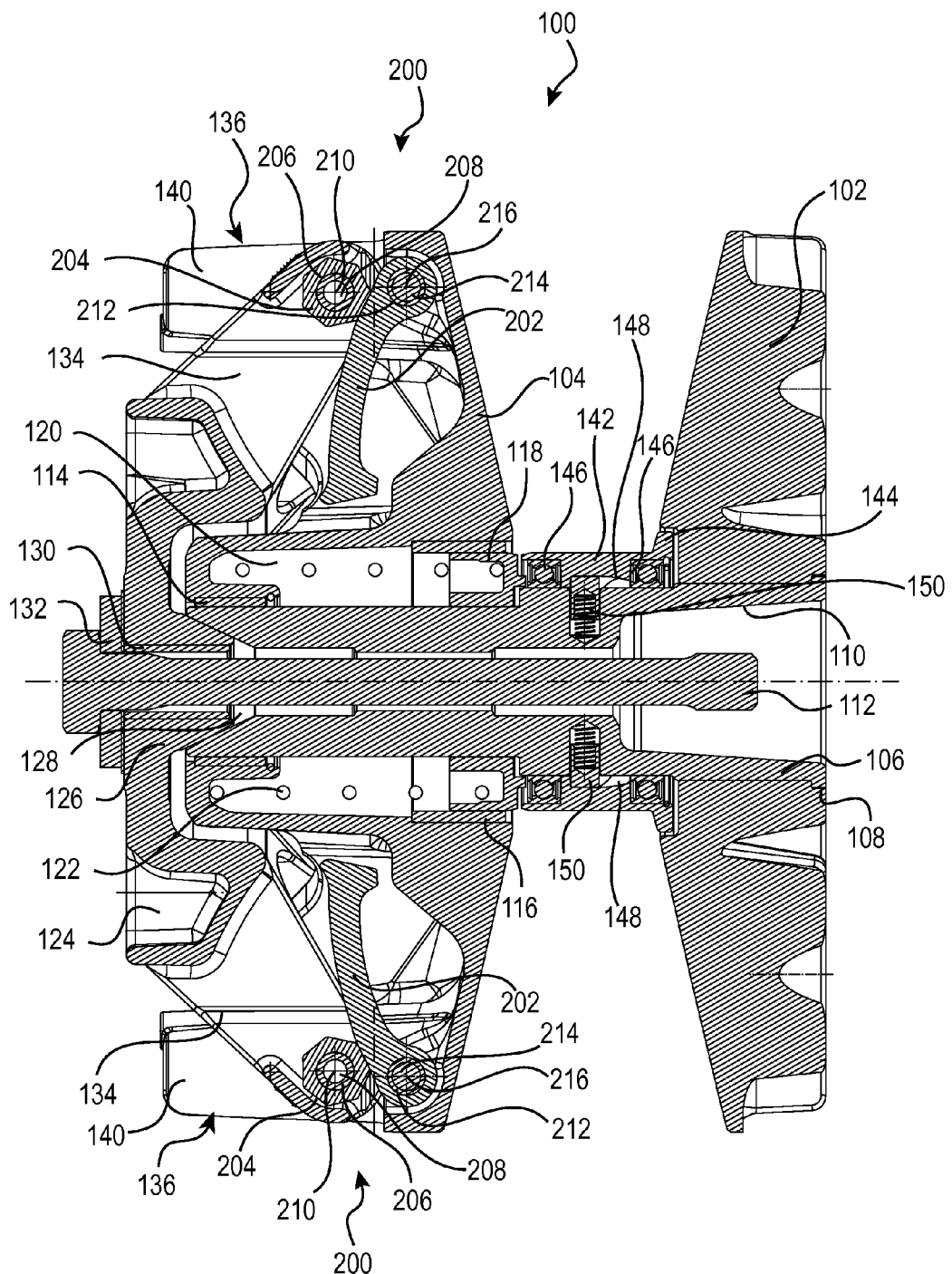
FIG. 5 is a cross-sectional view of the drive pulley of FIG. 4 taken through line A-A of FIG. 4, with the drive pulley in an opened position.
Figure 6:
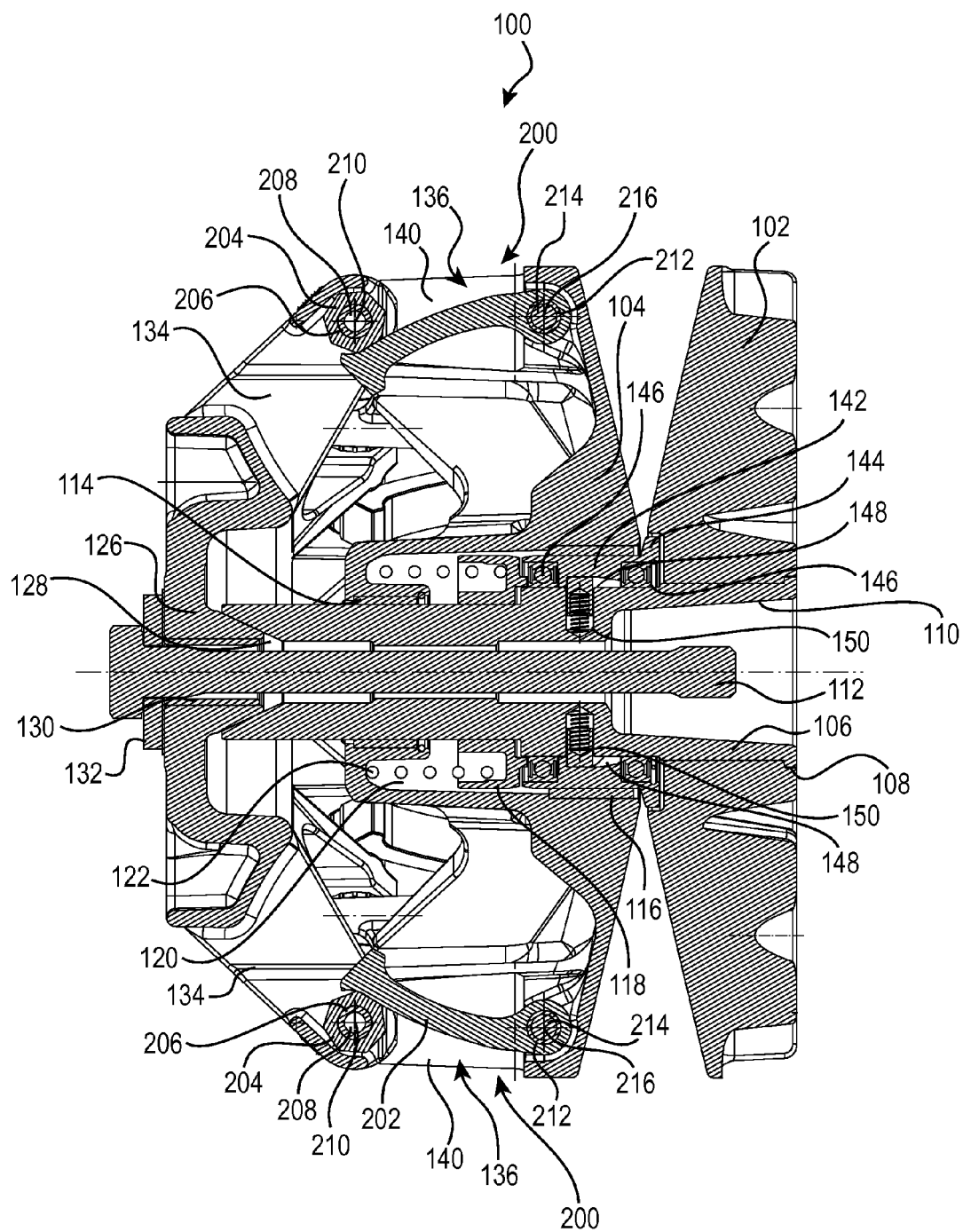
FIG. 6 is a cross-sectional view of the drive pulley of FIG. 4 taken through line A-A of FIG. 4, with the drive pulley in a closed position.

As best seen in FIGS. 5 and 6, the fixed sheave 102 is mounted on a shaft 106. The fixed sheave 102 is press-fitted on the shaft 106 such that the fixed sheave 102 rotates with the shaft 106, and therefore rotates with the crankshaft 22. A raised portion 108 of the shaft 106 is knurled to increase the strength of the press-fit connection between the fixed sheave 102 and the shaft 106. It is contemplated that the fixed sheave 102 could be connected to the shaft 106 in other known manners to make the fixed sheave 102 rotationally and axially fixed relative to the shaft 106.

A portion 110 of the shaft 106 is taper-fitted on the end of the crankshaft 22 such that the shaft 106 and the fixed sheave 102 rotate with the crankshaft 22. It is contemplated that the shaft 106 could be connected to the crankshaft 22 in other known manners. For example, the shaft 106 could engage the crankshaft 22 via splines. A bolt 112 inserted inside the shaft 106 is screwed inside the end of the crankshaft 22, thus retaining the shaft 106, and therefore the fixed sheave 102, on the crankshaft 22.

Two sleeves 114, 116 are received in the movable sheave 104. The sleeve 114 is disposed radially between the movable sheave 104 and the shaft 106. A spring holder 118 is disposed around the shaft 106. When the drive pulley 100 is in the opened position shown in FIG. 5, the spring holder 118 is disposed radially between the sleeve 116 and the shaft 106. The sleeves 114, 116 permit movement of the movable sheave 104 axially along the shaft 106. The movable sheave 104, the shaft 106 and the spring holder 118 define a spring cavity 120 therebetween. A coil spring 122 is disposed inside the cavity 120. The spring 122 abuts the movable sheave 104 at one end and the spring holder 118 at the other end. As the movable sheave 104 moves axially toward the fixed sheave 102, the spring 122 gets compressed as can be seen in FIG. 6. The spring 122 biases the movable sheave 104 away from the fixed sheave 102 toward the position shown in FIG. 5. The spring 122 is an exemplary embodiment of a biasing member that could be used to bias the movable sheave 104 away from the fixed sheave 102. It is contemplated that the movable sheave 104 could be biased away from the fixed sheave 102 by one or more biasing members other than the spring 122, such as, for example, but not limited to, Belleville washers.

A housing 124 is mounted on the end of the shaft 106 such that the movable sheave 104 is disposed axially between the housing 124 and the fixed sheave 102. A tapered portion 126 of the housing 124 is received in a tapered recess 128 formed in the end of the shaft 106. A sleeve 130 is disposed inside a central opening of the housing 124. The bolt 112 passes through the sleeve 130. A washer 132 is disposed between a head of the bolt 112 and the housing 124. As such, the bolt 112 holds the housing 124 against the end of the shaft 106 and the housing 124 is axially and rotationally fixed relative to the shaft 106. It is contemplated that other ways of connecting the housing 124 to the shaft 106 such that the housing 124 is rotationally fixed relative to the shaft 106 could be used. For example, the shaft 106 could have a flat side and the housing 124 could have a corresponding flat side. In another example, the end of the shaft 106 could have a polygonal cross-section with an opening in the housing 124 having a corresponding polygonal cross-section. In yet another example, the housing 124 could be fastened to the shaft 106.

The housing 124 has six arms 134. Each arm 134 is received in a corresponding recess 136 formed in the movable sheave 104. A spacer 138 (FIG. 4) is mounted to each side of each arm 134 and abuts a corresponding side wall 140 of a corresponding recess 136. As the movable sheave 104 moves toward or away from the fixed sheave 102, the arms 134 slide inside their corresponding recesses 136. The arms 134, via the spacers 138, by pushing on the side walls 130 of the recesses 136 transfer torque between the housing 124 and the movable sheave 104 such that the movable sheave 104 rotates with the shaft 106 while the sleeves 114, 116 permit axial movement of the movable sheave 104 relative to the shaft 106. As such, the movable sheave 104 is rotationally fixed and axially movable relative to the housing 124, the shaft 106 and the fixed sheave 102. It should be understood that although the movable sheave is described as being rotationally fixed relative to the housing 124, the shaft 106 and the fixed sheave 102, that there may be some small rotational movement of the movable sheave 104 relative to these part resulting from manufacturing tolerances and/or wear of the parts. As will be described below, the arms 134 and side walls 140 of the recesses 136 are used to connect the centrifugal actuators 200. It is contemplated that the housing 124 could have more or less than six arms 134, in which case a corresponding number of recesses 136 and centrifugal actuators 200 would be provided. It is contemplated that the movable sheave 104 could be connected to the shaft 106 in other known manners to make the movable sheave 104 rotationally fixed and axially movable relative to the shaft 106.

As best seen in FIGS. 5 and 6, a sleeve 142 having a flange 144 is mounted around the shaft 106 axially between the fixed sheave 102 and the spring holder 118. A pair of ball bearings 146 is disposed radially between the sleeve 142 and the shaft 106. The sleeve 142 has a plurality of helical groove 148 (only two of which are shown) formed in an inner surface thereof. A corresponding plurality of spring-loaded pins 150 (only two of which are shown) are disposed in radially extending recesses 152 in the shaft 106. Each spring-loaded pin 150 extends in a corresponding groove 148. A tab extending from the spring holder 118 abuts a lower race of an outermost bearing 146 (i.e. the left bearing 146 in FIGS. 5 and 6). The spring holder 118, as a result of the spring 122, biases the sleeve 142 and the ball bearings 146 toward the fixed sheave 102.

When the drive pulley 100 is in the opened position as shown in FIG. 5, the belt 20 is in contact with the sleeve 142. In some instances, it is possible that the belt 20 could be turning faster than the drive pulley 100. For example, this could happen when the ATV is going down a hill and the driver decides to release the throttle lever. In such instances, the belt 20 causes the sleeve 142 to turn in the same direction and faster than the shaft 106. As a result, the sleeve 142 moves toward the movable sheave 104 due to the helical grooves 148 and the pins 150. As the sleeve 142 moves toward the movable sheave 104, the flange 144 pushes the belt 20 against the movable sheave 104. Since the movable sheave 104 turns slower than the belt 20, the movable sheave 104, due to resistance in the engine 14, causes the belt 20 to slow down, which in turn, causes the ATV to slow down. This is sometimes referred to as engine braking. When the belt 20 turns at the same speed as the movable sheave 104, the spring 122 and the spring holder 118 push the sleeve 142 and bearings 146 back to their position shown in FIG. 5. It is contemplated that the sleeve 142 and bearings 146 could be omitted.

Figure 7A:
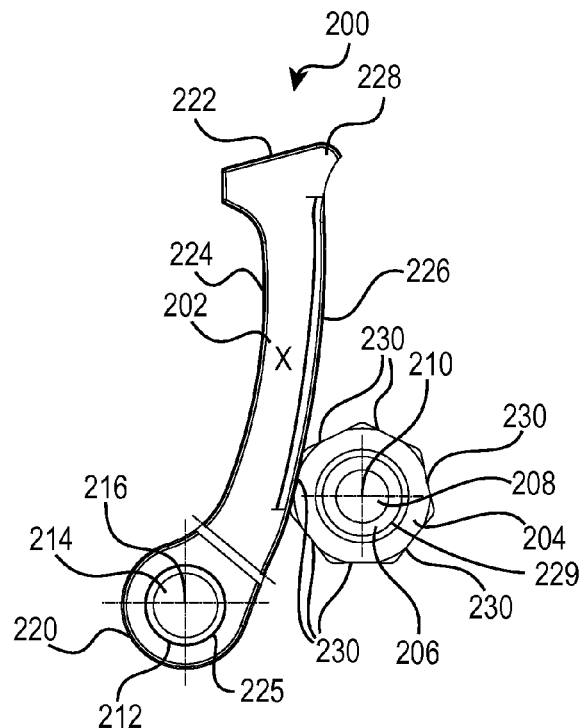
FIG. 7A is a side elevation view of an arm and slider of a centrifugal actuator of the drive pulley of FIG. 4 as positioned when the drive pulley is in an opened position.
Figure 7B:
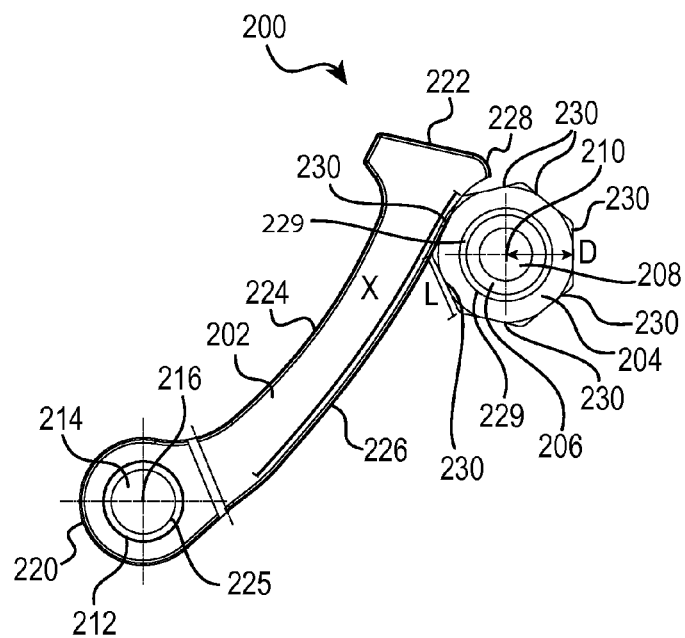
FIG. 7B is a side elevation view of an arm and slider of the centrifugal actuator of the drive pulley of FIG. 4 as positioned when the drive pulley is in a closed position.

The centrifugal actuators 200 will now be described in more detail. Each centrifugal actuator 200 includes an arm 202 and a slider 204. Six sliders 204 are pivotally connected to the six arms 134 of the housing 124. As best seen in FIGS. 7A and 7B, each slider 204 is disposed around a sleeve 206. Each sleeve 206 is disposed around an axle 208 defining an axis 210 about which the slider 204 can pivot. The axle 208 is inserted into apertures in its corresponding arm 134 and is held in place with the help of the spacers. The six arms 202 are pivotally connected in the six recesses 136 formed by the movable sheave 104. As best seen in FIGS. 7A and 7B, each arm 202 is disposed around a sleeve 212. Each sleeve 212 is disposed around an axle 214 defining an axis 216 about which the arm 202 can pivot. The axle 214 is inserted into apertures 218 in the side walls of its corresponding recess 136. A threaded fastener (not shown) fastens the axle 214 to the movable sheave 104.

Each slider 204 is aligned with a corresponding one of the arms 202 to form a centrifugal actuator 200. Since the housing 124 and the movable sheave 104 are rotationally fixed relative to the shaft 106, the sliders 204 remain aligned with their corresponding arms 202 when the shaft 106 rotates. It is contemplated that the sliders 204 could be pivotally connected in the recesses 136 and that the arms 202 could be connected to the arms 134 of the housing 124.

As seen in FIGS. 7A and 7B, each arm 202 has two ends 220, 222 and a central portion 224. The end 220 defines an aperture 225 to receive the sleeve 212 and the axle 214 therein. The central portion 224 has a generally constant cross-section and defines a ramp surface 226. As shown, the end 222 is wider than the central portion 226. The arm 202 is shaped so as to locate the center of gravity of the arm 202 at a desired location.

The ramp surface 226 is the surface of the arm 202 against which the slider 204 slides as the arm 202 pivots. As can be seen, in the present embodiment, the ramp surface 226 is convex. It is contemplated that the ramp surface could be shaped differently. The ramp surface 226 has a length X, which is the distance from the contact point between the arm 202 and a surface of the slider 204 in contact with the ramp surface 226 that is closest to the end 220 when the drive pulley 100 is in the fully opened position (FIG. 5) and the contact point between the arm 202 and the slider 204 that is closest to the end 222 when the drive pulley 100 is in the fully closed position (FIG. 6). It should be understood that the length X is determined with respect to a new surface (i.e. not worn) of the slider 204 that is contact with the ramp surface 226.

The end 222 defines a protrusion 228 adjacent to the ramp surface 226. The protrusion 228 limits the movement of the slider 204 relative to the arm 202 by preventing the slider 204 from sliding to far from the end 220 of the arm 202.

As also seen in FIGS. 7A and 7B, each slider 204 defines an aperture 229 to receive the sleeve 206 and the axle 208 therein and has seven slider surfaces 230. As such, a cross-section of each slider 204 taken about a plane normal to the axis 210 is generally heptagonal in shape. During operation of the drive pulley 100, one of the slider surfaces 230 is in contact with the ramp surface 226. As will be explained below, when the drive pulley 100 is not in operation, should the slider surface 230 that is in contact with the ramp surface 226 be worn, the slider 204 can be turned about the axis 210 to put another one of the slider surfaces 230 in contact with the ramp surface 226. In the present embodiment, each slider surface 230 is concave so as to be complementary in shape with the convex ramp surface 226 of the corresponding arm 202. As each slider surface 230 in the present embodiment is complementary in shape with the ramp surface 226, all of the slider surfaces 230 are adapted to be in contact with the ramp surface 226. It is contemplated that less than all of the slider surfaces 230 could be adapted to be in contact with the ramp surface 226. For example, only one, two or three slider surfaces could be adapted to be in contact with the ramp surface 226. In such embodiments, the slider surfaces 230 that are not intended to be put in contact with the ramp surface 226 could have a shape that is not complementary to the shape of the ramp surface 226. It is also contemplated that the slider surfaces 230 could have a shape other than concave should the shape of the ramp surface 226 be other than convex. For example, in an embodiment where the ramp surface 226 is concave, the slider surfaces 230 are convex.

The slider surfaces 230 adapted to be in contact with the ramp surface 226, which in the case of the embodiment of FIGS. 5 to 7B is every slider surface 230, have a length L. The length L is greater than a diameter of the aperture in the slider 204 that receives the sleeve 206 and axle 208. The length L is also greater than a distance D from the axis 210 to a center of a slider surface 230 adapted to be in contact with the ramp surface 226. The length L is less than 20% of the length X of the ramp surface 226 of the arm 202. In operation, the contact surface between the ramp surface 226 and the slider 204 has a length that is greater than 10% the length X to provide better wear resistance. It is contemplated that each slider 204 could have an odd number of slider surfaces 230 such as three or five, although even number of slider surfaces 230 are also contemplated. It should be understood that for two sliders having a different number of slider surfaces but that can be circumscribed by circles having the same diameter passing through each of their corresponding vertices, the slider having less slider surfaces has slider surfaces that are longer than those of the slider having more slider surfaces. Sliders 204 having three slider surfaces 230 or any number of slider surfaces 230 above three are contemplated.

Referring now to FIGS. 5 and 6, an operation of the drive pulley 100 will be described. When the crankshaft 22 is not turning or is turning at low speeds, the drive pulley 100 is in the configuration shown in FIG. 5. As the speed of rotation of the crankshaft 22 increases, the speed of rotation of the drive pulley 100 increases with it. As a result, the arms 202 pivot about their respective axes 216, thereby moving away from the shaft 106. As the arms 202 pivot, the ramp surfaces 226 push against the slider surfaces 230 of the sliders 204 that are in contact with the ramp surfaces 226 to move the movable sheave 104 axially toward the fixed sheave 102. When the speed of rotation of the crankshaft 22 is high enough, the movable sheave 104 moves to the position shown in FIG. 6, which is as close as the movable sheave 104 can be to the fixed sheave 102. As the speed of rotation of the crankshaft 22 decreases, the arms 202 pivot about the axis 216 back toward the shaft 106 and the spring 122 moves the movable sheave 104 axially away from the fixed sheave 102. As can be seen by comparing the position of the slider 204 in FIG. 7A to the position of the slider 204 in FIG. 7B, as the arms 202 pivot, the sliders 204 pivot slightly about their respective axes 210 in order to follow the ramps surfaces 226.

As the slider surfaces 230 of the sliders 204 that are in contact with the ramp surfaces 226 of the arms 202 slide along their respective ramp surfaces 226, they become worn. Also, as previously explained, another factor that can causes wear of the slider surfaces 230 in contact with the ramp surfaces 226 is the small rotational movements of the movable sheave 104 relative to the housing 124 resulting from manufacturing tolerances and/or wear of the housing 124, the shaft 106, the fixed sheave 102, the movable sheave 104 and the associated parts. These rotational movements cause relative movements between the sliders 204 and the arms 202 generally parallel to their respective axes 210, 216 that lead to wear of the slider surfaces 230 in contact with the ramp surfaces 226. As the slider surfaces 230 in contact with the ramp surfaces 226 become worn, the length of these surfaces increases. As a result, the angle by which the arms 202 can pivot and the distance by which the slider 204 can slide along the ramp surface 226 are reduced. When a slider surface 230 that is in contact with a ramp surface 226 becomes worn, when the drive pulley 100 is not in operation, the slider 204 can be turned to put another one of the slider surfaces 230 that is not worn in contact with the ramp surface. Since the slider surface 230 that becomes worn also wears down the slider surfaces 230 adjacent to it by making them shorter as it becomes worn, the slider surface 230 that is not worn which is selected to now be in contact with the ramp surface 226 is separated from the slider surface 230 that was previously in contact with the ramp surface 226 by at least one slider surface 230. As such, for the slider 204 having seven slider surfaces 230, or for a slider having six slider surfaces, three different unworn slider surfaces 230 can be put in contact with its corresponding ramp surface 226 before all of the slider surfaces 230 become worn from direct contact with the ramp surface 226 or as a result of an adjacent slider surface 230 becoming worn, thus making it shorter. For a slider having four or five slider surfaces, two different unworn slider surfaces can be put in contact with its corresponding ramp surface before all of the slider surfaces become worn in one way or another. It is however contemplated that all of the slider surfaces 230 could be used successively to be in contact with their corresponding ramp surface 226.

Due to the shape of the slider surface 230, it is unlikely that while the drive pulley 100 is in use the slider 204 will turn sufficiently about the axis 210 so as to cause a change in the slider surface 230 that is in contact with the ramp surface 226. In other words, it is unlikely that the slider 204 would roll on the ramp surface 226 during operation of the drive pulley. However, it is contemplated that each slider 204 could be provided with a locking mechanism that would permit it to pivot about the axis 210 in order to follow its corresponding ramp surface 226 but would prevent the slider 204 to roll along the ramp surface 226. When the slider surface 230 that is in contact with the ramp surface 226 becomes worn, when the drive pulley 100 is not in operation, the locking mechanism is disengaged, the slider 204 is turned to place another slider surface 230 in contact with the ramp surface 226 and the locking mechanism is engaged.

Turning now to FIGS. 8A to 9E, various alternative embodiments of arms and sliders will be described. For simplicity, elements of the arms and sliders in FIGS. 8A to 9E that are similar to those of the arm 202 and slider 204 described above have been labelled with the same reference numerals and will not be described again in detail.

Figure 8A:
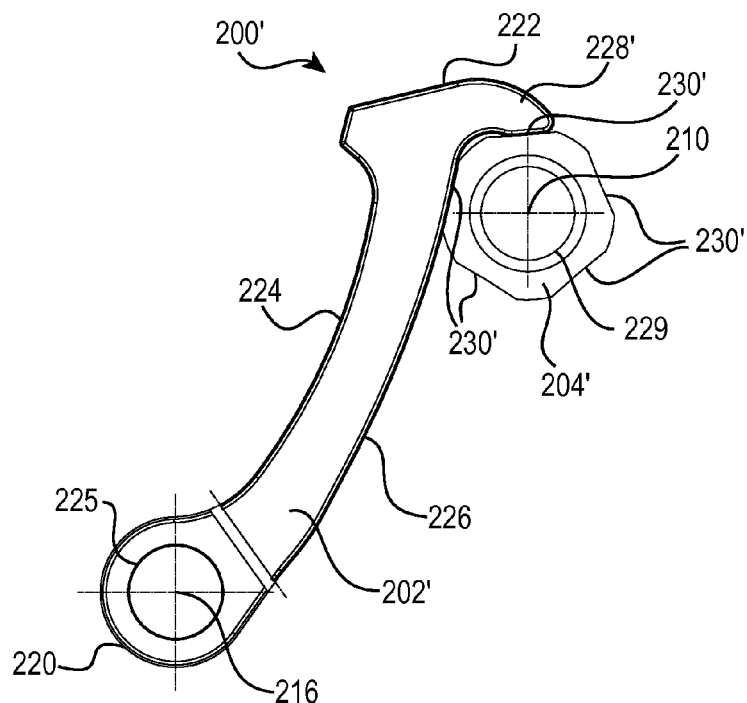
FIGS. 8A and 8B are side elevation views of alternative embodiments of arm and slider combinations.

In FIG. 8A, a centrifugal actuator 200' has an arm 202' and a slider 204'. As can be seen, the slider 204' has five slider surfaces 230'. All of the slider surfaces 230' are concave so as to be complementary in shape with the ramp surface 226 and are therefore adapted to contact the ramp surface 226. The end 222 of the arm 202' has a protrusion 228' generally shaped like a hook. When the slider 204' reaches the position shown in FIG. 8A relative to the ramp surface 226, the slider surface 230' that is adjacent to the slider surface 230' that is in contact with the ramp surface 226 (i.e. the top slider surface 230' in FIG. 8A) comes in contact with a surface of the protrusion 228' as shown. The protrusion 228' therefore limits how close the movable sheave 104 can be to the fixed sheave 102.

Figure 8B:
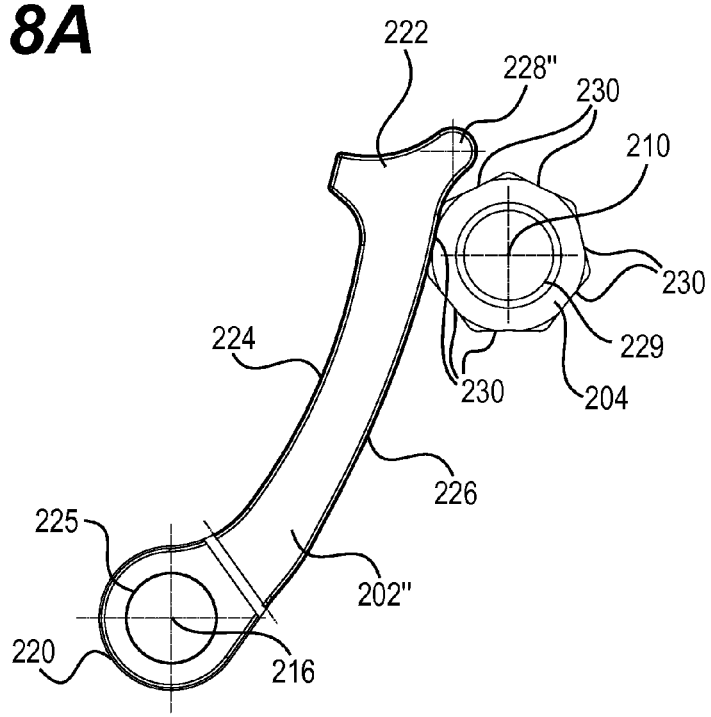

In FIG. 8B, a centrifugal actuator 200" has an arm 202" and the slider 204. The end 222 of the arm 202" has a protrusion 228" that has a generally semi-circular profile.

FIGS. 9A to 9E illustrate various sliders that are adapted to be used with the arm 202 described above. Since the ramp surface 226 of the arm 202 is convex, the slider surfaces of the sliders 204A to 204E that are adapted to contact the ramp surface are concave. Should the ramp surface 226 of the arm 202 have a different shape, the slider surfaces of the slider 204A to 204E that are adapted to contact the ramp surface would have a shape complementary to the shape of the ramp surface 226.

In FIG. 9A, a slider 204A has four concave slider surfaces 230A all of which are adapted to be contact with the ramp surface 226. As indicated above, two different unworn slider surfaces 230A can be put in contact with the ramp surface 226 before all of the slider surfaces 230A become worn in one way or another. In order to help the user determine which two of the four slider surfaces 230A should be used to be put in contact with the ramp surface 226 (i.e. the top and bottom surfaces 230A or the left and right surfaces 230A with reference to FIG. 9A), it is contemplated that the slider 204A could provide some kind of indicator. For example, the two slider surfaces 230A that should not be used could be of a different color. In another example, words or symbols could be used to identify the slider surfaces 230A to be used and/or the slider surfaces 230A that are not to be used.

In FIG. 9B, a slider 204B has two concave slider surfaces 230A that are adapted to be contact with the ramp surface 226 and two convex slider surfaces 230B that are not adapted to be in contact with the ramp surface 226. It is contemplated that the slider surfaces 230B could have other shapes that would indicate to a user that they are not intended to be in contact with the ramp surface 226. The slider 204B is also provided with markers 232. When one of the slider surfaces 230A becomes worn to the point that its corresponding markers 232 have disappeared, a user knows that it is time to turn the slider 204B to put the other contact surface 230A in contact with the ramp surface 226.

In FIG. 9C, a slider 204C has five concave slider surfaces 230C all of which are adapted to be contact with the ramp surface 226. As indicated above, two different unworn slider surfaces 230C can be put in contact with the ramp surface 226 before all of the slider surfaces 230C become worn in one way or another. In order to help the user determine which two of the five slider surfaces 230C should be used to be put in contact with the ramp surface 226, it is contemplated that the slider 204C could provide some kind of indicator similar to the kind of indicators described above with respect to the slider 204A.

In FIG. 9D, a slider 204D has two concave slider surfaces 230C that are adapted to be contact with the ramp surface 226 and three flat slider surfaces 230D that are not adapted to be in contact with the ramp surface 226. It is contemplated that the slider surfaces 230D could have other shapes that would indicate to a user that they are not intended to be in contact with the ramp surface 226.

Figure 9E:
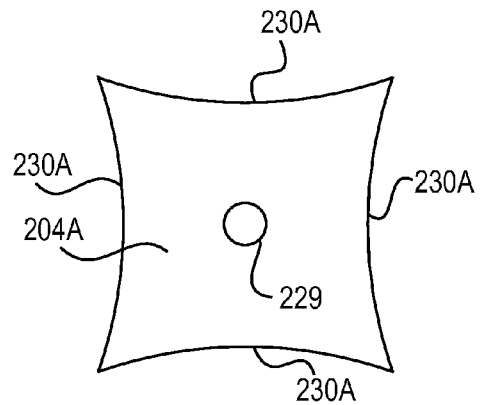
Figure 9E:
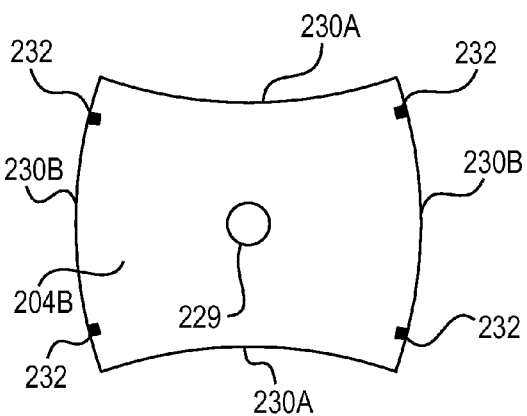
Figure 9E:
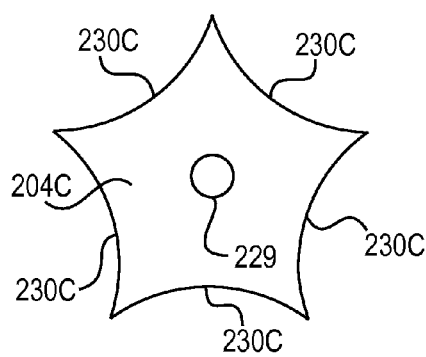
Figure 9E:
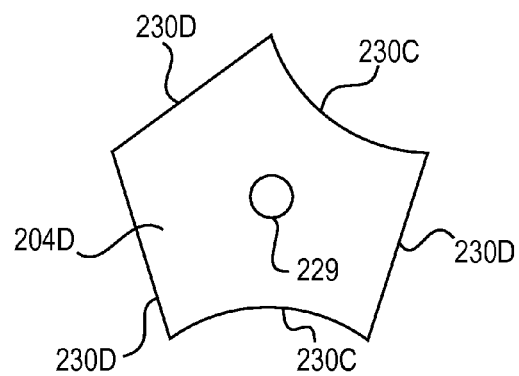
Figure 9E:
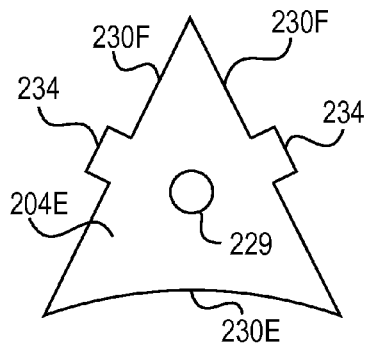

In FIG. 9E, a slider 204E has one concave slider surface 230E that is adapted to be contact with the ramp surface 226 and two slider surfaces 230F that are not adapted to be in contact with the ramp surface 226. To indicate that the slider surfaces 230F are not to be put in contact with the ramp surface 226, the slider surfaces 230F have protrusions 234.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A drive pulley for a continuously variable transmission comprising:
    a fixed sheave;
    a movable sheave axially movable relative to the fixed sheave, the movable sheave being rotationally fixed relative to the fixed sheave;
    a biasing member biasing the movable sheave axially away from the fixed sheave;
    at least one arm pivotally connected about a first axis to one of the movable sheave and a portion of the drive pulley axially and rotationally fixed to the fixed sheave, the arm having a ramp surface; and
    at least one slider in alignment with the ramp surface of the at least one arm, the at least one slider being pivotally connected about a second axis to the other one of the movable sheave and the portion of the drive pulley, the at least one slider having at least three slider surfaces, at least one of the at least three slider surfaces is adapted to contact the ramp surface of the at least one arm,
    the at least one arm pivoting about the first axis as a speed of rotation of the drive pulley increases, the ramp surface of the at least one arm pushing against one of the slider surfaces of the at least one slider adapted to contact the ramp surface as the at least one arm pivots about the first axis thereby moving the movable sheave axially toward the fixed sheave.

2. The drive pulley of claim 1, wherein the portion of the drive pulley is a housing axially and rotationally fixed to the fixed sheave.

3. The drive pulley of claim 2, wherein the at least one arm is pivotally connected about the first axis to the movable sheave and the at least one slider is pivotally connected about the second axis to the housing.

4. The drive pulley of claim 1, wherein the at least one slider has at least five slider surfaces and at least two of the at least five slider surfaces are adapted to contact the ramp surface of the at least one arm.

5. The drive pulley of claim 4, wherein the at least one slider has less than eight slider surfaces.

6. The drive pulley of claim 5, wherein the at least one slider has seven slider surfaces and at least three of the seven slider surfaces are adapted to contact the ramp surface of the at least one arm.

7. The drive pulley of claim 6, wherein the seven slider surfaces are adapted to contact the ramp surface of the at least one arm.

8. The drive pulley of claim 4, wherein the at least two of the at least five slider surfaces adapted to contact the ramp surface of the at least one arm include a first slider surface adapted to contact the ramp surface and a second slider surface adapted to contact the ramp surface;
    wherein the first slider surface adapted to contact the ramp surface is separated from the second slider surface adapted contact the ramp surface by at least one other of the at least five slider surfaces on each side thereof; and
    wherein the at least one slider can be turned while the drive pulley is not rotating to put either one of the first and second slider surfaces adapted to contact the ramp surface in contact with the ramp surface.

9. The drive pulley of claim 1, wherein at least three of the at least three slider surfaces are adapted to contact the ramp surface of the at least one arm.

10. The drive pulley of claim 9, wherein each of the at least three slider surfaces is adapted to contact the ramp surface of the at least one arm.

11. The drive pulley of claim 1, wherein the at least one slider has an odd number of slider surfaces.

12. The drive pulley of claim 1, wherein a cross-section of the at least one slider taken about a plane normal to the second axis is generally heptagonal in shape.

13. The drive pulley of claim 1, wherein the ramp surface of the at least one arm and the at least one of the at least three slider surfaces of the at least one slider are complementary in shape.

14. The drive pulley of claim 13, wherein the ramp surface of the at least one arm is convex and the at least one of the at least three slider surfaces of the at least one slider is concave.

15. The drive pulley of claim 14, wherein each of the at least three slider surfaces of the at least one slider is concave.

16. The drive pulley of claim 1, wherein a length of the at least one of the at least three slider surfaces of the at least one slider is greater than a distance from the second axis to a center of the at least one of the at least three sliders surfaces of the at least one slider.

17. The drive pulley of claim 1, wherein a length of the at least one of the at least three slider surfaces of the at least one slider is less than 20 percent of a length of the ramp surface of the at least one arm.

18. The drive pulley of claim 1, further comprising, for each of the at least one slider:
    an axle connected to the other one of the movable sheave and the portion of the drive pulley; and
    a sleeve disposed around the axle;
    wherein the slider is disposed around the sleeve.

19. The drive pulley of claim 1, wherein the at least one arm has a protrusion adjacent the ramp surface at an end of the at least one arm opposite an end of the at least one arm that is pivotally connected to the one of the movable sheave and the portion of the drive pulley.

20. The drive pulley of claim 19, wherein one of the at least three slider surfaces of the at least one slider other than the slider surface of the at least one slider in contact with the ramp surface contacts the protrusion to limit pivoting of the at least one arm about the first axis.

* * * * *

UNITED STATES PATENT AND TRADEMARK OFFICE
CERTIFICATE OF CORRECTION

| | | |
|---|---|---|
| PATENT NO. | : 9,057,432 B1 | Page 1 of 1 |
| APPLICATION NO. | : 13/852585 | |
| DATED | : June 16, 2015 | |
| INVENTOR(S) | : Eric Bouffard et al. | |

It is certified that error appears in the above-identified patent and that said Letters Patent is hereby corrected as shown below:

Claims

Claim 8, Column 12, line 15, "adapted contact" should read -- adapted to contact --

Signed and Sealed this
Twenty-seventh Day of October, 2015

Michelle K. Lee
*Director of the United States Patent and Trademark Office*